US005520287A

United States Patent [19]
Roth

[11] Patent Number: 5,520,287
[45] Date of Patent: May 28, 1996

[54] METHOD AND APPARATUS FOR DIVIDING FAT AND LEAN MEAT

[75] Inventor: Eldon Roth, Dakota Dunes, S. Dak.

[73] Assignee: Freezing Machines, Inc., Dakota Dunes, S. Dak.

[21] Appl. No.: 323,628

[22] Filed: Oct. 17, 1994

[51] Int. Cl.[6] .............................. B07C 5/00; F16L 53/00

[52] U.S. Cl. ............................ 209/11; 209/577; 209/922; 209/938; 138/33; 138/145; 138/DIG. 3; 99/489

[58] Field of Search .............................. 209/3.2, 11, 577, 209/656, 938, 922, 587; 99/353, 489; 219/407, 408; 138/33, 127, 137, 140, 141, 145, DIG. 3; 426/113, 203, 234

[56] References Cited

U.S. PATENT DOCUMENTS

| | | | |
|---|---|---|---|
| 2,353,382 | 7/1944 | Barrett | 99/489 X |
| 2,724,672 | 11/1955 | Rubin | 138/DIG. 3 X |
| 3,050,786 | 8/1962 | St. John et al. | 138/DIG. 3 X |
| 3,619,560 | 11/1971 | Buiting et al. | 219/407 X |
| 4,201,302 | 5/1980 | Roth | 209/577 |
| 4,667,084 | 5/1987 | Regge | 138/33 X |

OTHER PUBLICATIONS

"TEFLON", TFE —Flourocarbon Resins, Impregnation of Glass Cloth and Preparation of Laminates, No. X–64a, DuPont.

*Primary Examiner*—William E. Terrell
*Assistant Examiner*—Tuan Nguyen
*Attorney, Agent, or Firm*—Russell D. Culbertson; Shaffer & Culbertson

[57] ABSTRACT

In a method and apparatus (10) for dividing meat components such as fat and lean mean, the combined fat and lean meat are extruded into one or more chains of material wherein the fat and lean meat are divided into discrete sections along the length thereof. Each chain of material passes through a conduit (14) and the character of material along each chain is sensed by a suitable sensor (18). The fat and lean meat are then diverted by a diverter (20) functioning in delayed response to the sensor (18) in order to separate the fat and lean meat. The apparatus (10) includes an arrangement for preventing the buildup of material on the internal surface of each conduit (14) and thereby prevents any such buildup from interfering with the operation of the sensor (18) or diverter (20). The buildup preventing arrangement preferably includes a heater element (54) associated with each conduit (14) to heat the inner wall of the conduits. Alternatively or additionally the buildup preventing arrangement may include a non-stick material (60) forming the inner surface of the conduit (14).

8 Claims, 2 Drawing Sheets

METHOD AND APPARATUS FOR DIVIDING FAT AND LEAN MEAT

BACKGROUND OF THE INVENTION

The present invention relates to a method and apparatus for dividing meat components such as fat and lean meat. More particularly, the invention relates to a method and apparatus wherein the fat and lean meat are first extruded and pumped through a tube or conduit to form a generally continuous chain of material and then divided by a suitable mechanism operating in response to a sensor positioned along the conduit. The improvement includes means for preventing fat and other material from building up in the conduit and interfering with the operation of the device.

U.S. Pat. No. 4,201,302 (the '302 Patent), the specification of which is incorporated herein by reference, is directed to a method and apparatus for dividing fat and lean meat. The apparatus disclosed in the '302 Patent includes a grinder for grinding meat products and extruding the products through one or more tubes. The meat products form continuous chains of material in the tubes comprising sections of fat and sections of lean meat. A diverter mechanism operating in response to a sensor on each tube, diverts the fat sections to one collecting chamber and the lean meat sections to another collecting chamber. This apparatus disclosed in the '302 Patent eliminated many problems associated with the manual separation of the fat and lean portions of meat products. The apparatus also eliminated problems associated with prior automated fat and lean meat separating devices.

Although the apparatus and method disclosed in the '302 Patent was a significant improvement over prior automated fat and lean meat separating devices, the apparatus and method did suffer from occasional problems which prevented optimum separation. Most significantly, material tended to build up on the conduit walls and interfered with sensor operations. The buildup of material also interfered with flow of materials in the conduit and also led to chunks of material breaking loose and interfering with the desired separating function of the diverter. Accordingly, there remains a need for a method and apparatus for more efficiently separating meat components such as fat and lean meat.

SUMMARY OF THE INVENTION

It is therefore an object of the present invention to provide an improved meat component separation method and apparatus that overcomes the above-described problems and others associated with prior devices in particular the device and method shown in the '302 Patent.

The apparatus according to the invention includes means for extruding meat components into chains which pass through conduits similar to the arrangement shown in the '302 Patent. Also similar to the '302 Patent, the apparatus includes a sensor associated with each conduit and a diverter arrangement responsive to the sensor to divert meat components segregated into sections along the length of the chains. The apparatus of the present invention also includes means for preventing the buildup of material on the conduit wall in each conduit. The buildup preventing means eliminates sensor interference and other interference caused by the buildup of material in the conduits.

In the preferred form of the invention, the buildup preventing means includes a heater element associated with each conduit. The heater element may extend along just the sensor area of the conduit, but preferably extends along the entire length of each conduit. The heater element may comprise an electrical resistance-type element wrapped around the outer surface of the conduit or positioned longitudinally along the outer surface of each conduit. Alternatively, the heater element may be positioned on or within the conduit in any suitable way to apply a desired amount of heat to the inner wall of the conduit. The heat applied to the conduit inner wall is sufficient to maintain the conduit inner wall at a fat melting temperature and thereby produce a layer of liquid fat at the wall surface. This layer of liquid fat does not allow fat and other meat components to adhere to the wall and then build up to create the problems associated with prior devices.

Alternatively to the heater arrangement, the buildup preventing means may include a non-stick material positioned on the inside wall of each conduit. The non-stick surface may be a TEFLON® coating or any other suitable non-stick material. Additionally, the buildup preventing means may incorporate a combination of both heater elements along the conduit and a non-stick material on the inner wall of the conduit.

Regardless of whether the buildup preventing arrangement includes a non-stick material on the interior wall of the conduits, a heater arrangement for heating the inner wall of the conduits, or a combination of these two arrangements, the structure according to the invention functions to prevent the buildup of material at least in the sensor area and preferably at any other point along the length of each conduit. Thus the sensors function without interference from buildup and the apparatus functions without interference from chunks of built up material which break off periodically during operation.

These and other objects, advantages, and features of the invention will be apparent from the following description of the preferred embodiment, considered along with the accompanying drawings.

DESCRIPTION OF THE PREFERRED EMBODIMENTS

Figure 1:
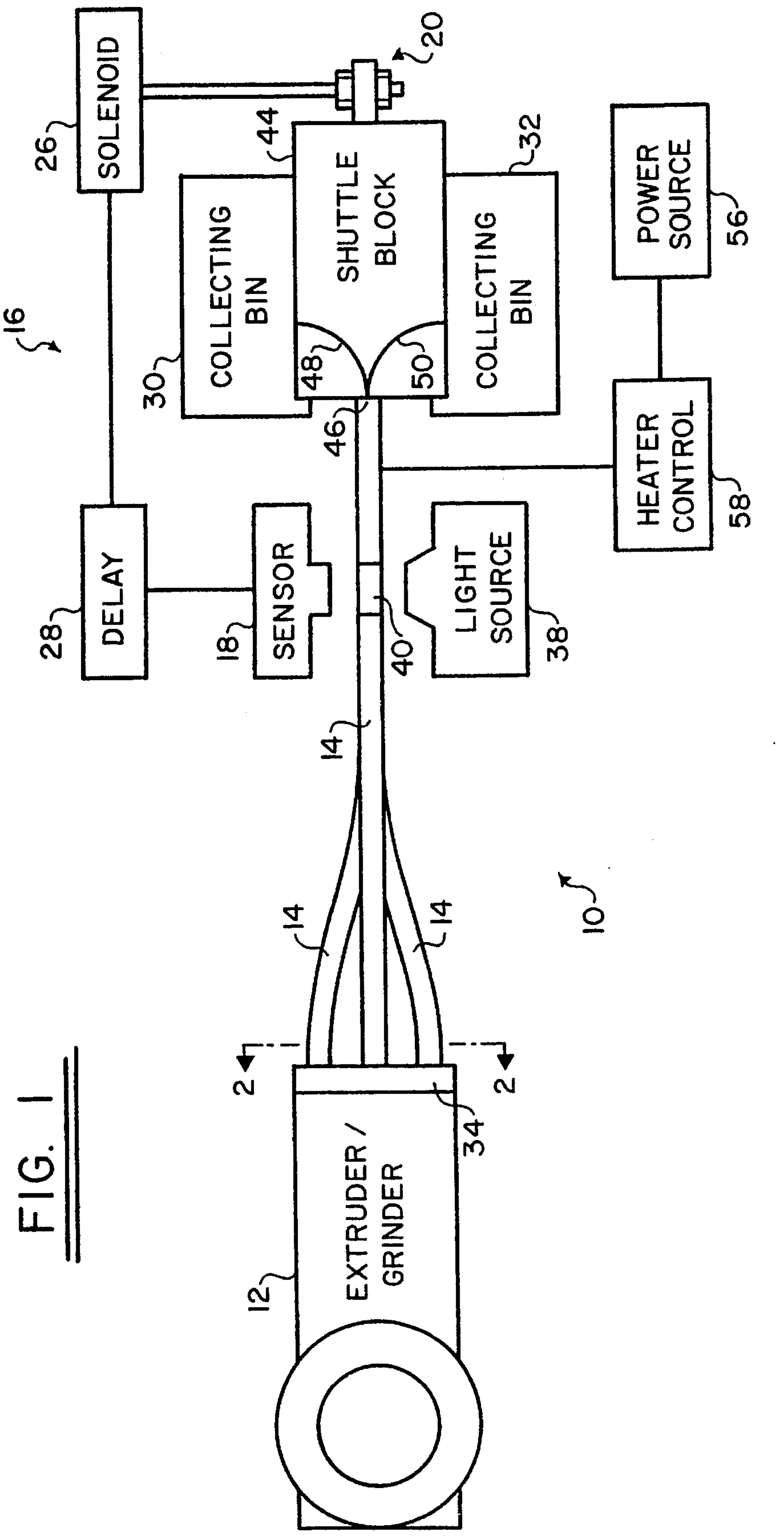
FIG. 1 is a generally schematic plan view of an apparatus embodying the principles of the invention.
Figure 4:
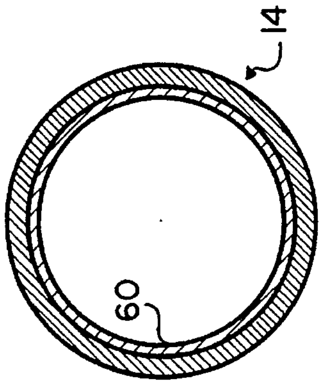
FIG. 4 is a transverse section view of an alternate conduit having a non-stick material on its inner wall.
Figure 3:
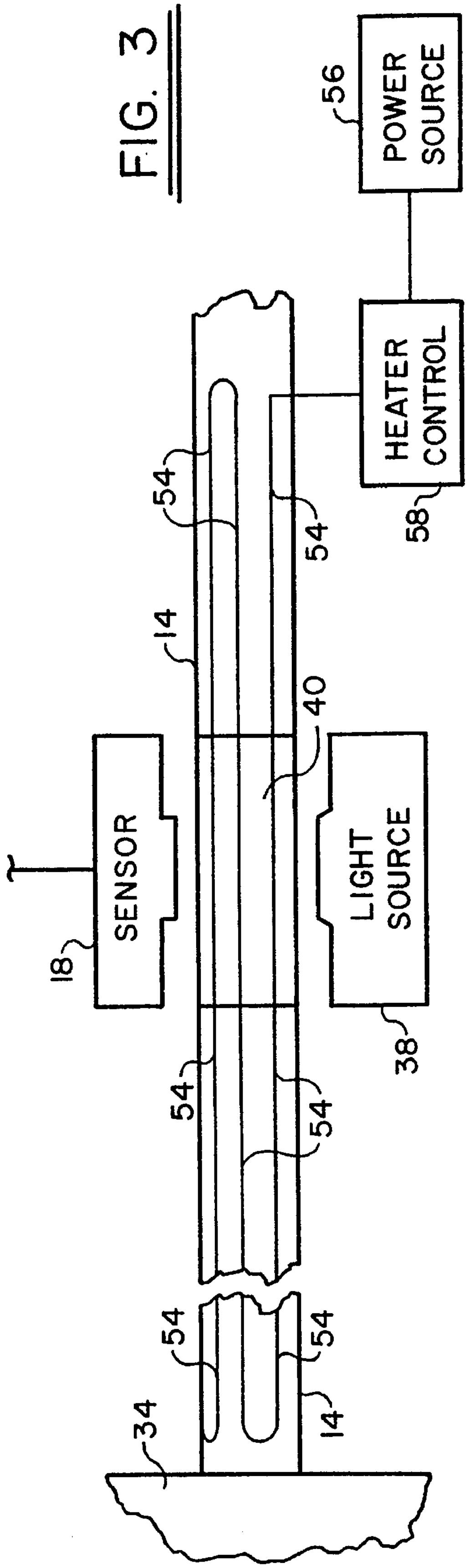
FIG. 3 is an enlarged side view of one of the conduits incorporating a heater element according to the invention.
Figure 2:
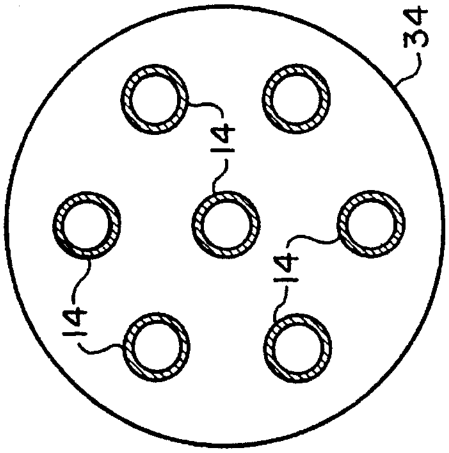
FIG. 2 is a view taken along line 2—2 in FIG. 1.

FIGS. 1 through 3 illustrate one preferred apparatus 10 embodying the principles of the invention for separating fat and lean meat, while FIG. 4 illustrates an alternate conduit according to the invention. The apparatus 10 is discussed and described herein primarily in terms of separating fat and lean meat, which is the preferred application of the invention. However, those skilled in the art will readily appreciate that the invention may be used to separate other meat components. Also, the invention may be applied to separate foreign material from meat components. Additionally, the invention may also be employed for separating other food products where individual constituents of the food products have characteristics capable of detection by some type of sensor.

The apparatus 10 includes extruding means 12 and a plurality of extruding conduits or tubes 14. The extruding means or grinder 12 extrudes fat and meat through each conduit 14 in the form of an endless chain of material. As discussed below the material separates as it is extruded from the grinder 12 to form separate sections of fat and lean meat along the endless chain within each conduit 14.

The chain of material from each tube 14 is diverted by a separating means shown generally at 16 including sensor means 18 and diverter mechanism 20. The diverting mechanism is separated from the sensor 18 by an extension conduit 22 and is operated by a double acting solenoid 26 under control of delay circuitry schematically represented at 28. The sensor 18 detects the meat component as it passes through the respective conduit 14 and produces a sensor signal in response to the presence of the meat component. The sensor signal is used to operate the solenoid 26 and, under the delay of circuit 28, positions the diverter mechanism to divert the lean meat component to a collection bin 30 and the fat component to another collection bin 32.

The extruding means or grinder 12 preferably comprises a rotating auger type grinder that receives meat components, cuts or grinds up the material, and then forces the ground material through die plate 34. The conduits 14 are connected to openings in the die plate 34 in position to receive the material extruded through the die plate openings. The grinder 12 and die plate 34 arrangement operates to separate the fat and lean meat introduced into the grinder into discrete sections as it is pressed out of the die openings. This produces a continuous or endless chain of material made up of sections of fat alternating with sections of lean meat. For purposes of separating and extruding lean meat, the die plate openings have a preferred or maximum size of about one-half (½) inch and more preferably are in a size range of about one-eighth (⅛) to one-quarter (¼) inch if substantial separation is desired. Alternatively, if a lesser degree of separation is required, the die plate openings may have a larger diameter. The larger diameter openings in the die plate 34 still produce sections of fat and lean meat, however, the sections tend to be less differentiated with more fat in the lean meat sections and more lean meat in the fat sections.

As shown in FIG. 1, the conduits 14 are arranged in a line to facilitate positioning both the sensor 18 for each conduit and the diverter mechanism 20 for each conduit. Preferably, a light source 38 is associated with each sensor 18 and the sensor comprises a photoelectric sensing unit. Where a photoelectric sensor 18 is employed, each conduit 14 includes a sensing portion 40 made of a suitable transparent material such as a clear plastic. Although a photoelectric sensor is shown in the drawings for purposes of illustration, those skilled in art will readily appreciate that the sensor 18 may be any device capable of distinguishing the components forming the endless chains of material in the conduits 14 and providing a suitable signal that can be used to operate the solenoid 26 associated with the diverter mechanism 20.

The diverter mechanism 20 comprises a shuttle block 44 for each conduit 14. Each shuttle block 44 is positioned relative to the conduit extension 22 with its respective solenoid 26. Additionally, each shuttle block 44 includes a diverter edge 46 and guide surfaces 48 and 50. As the shuttle block 44 moves under control of the solenoid 26 from one extreme position to the other, the diverter edge 46 passes over the end of the conduit extension 22 and places either guide surface 48 or 50 in position to direct material exiting the conduit to the appropriate collection bin 30 or 32. The delay circuit 28 synchronizes the movement of each shuttle block such that the shuttle block is correctly positioned by the time the material sensed at the sensing portion 40 of the conduit 14 travels the length of the respective conduit extension 22.

Thus far the apparatus that has been described is essentially the same as the apparatus described and claimed in the '302 patent. According to the present invention, the apparatus 10 further includes buildup preventing means. In the embodiment shown in FIGS. 1 through 3, and particularly in FIG. 3, the buildup preventing means includes a heater element 54 associated with each conduit 14. The preferred heater element 54 is an electrical resistive element and the buildup preventing means further includes a power source 56 and electrical control 58 for controlling the power applied to the heating element. The heating element 54 is powered through the power source 56 and control 58 to provide sufficient heat to heat the inner surface of the respective conduit 14 to a fat melting temperature that creates a layer of liquid fat or at least soft fat at the inner surface of the conduit. This layer of liquid fat or softened fat prevents the material in the conduit from sticking to the wall of the conduit. In the preferred form of the invention, for example, the inner surface of each conduit may be kept at approximately 100° F. However, those skilled in the art will readily appreciate that the temperature required to prevent material from sticking to the inner surface of the conduits 14 may vary depending upon the flow rate of material through the conduits and upon the type of material passing through the conduits.

The heater element 54 shown in the figures extends longitudinally back and forth along the length of the conduit 14 at different angular orientations around the outer surface of the conduit. Alternatively, the heater element 54 could be wrapped helically or in some other configuration on the outside of each conduit 14. Also, the heating element need not be positioned on the outside of the conduit even though the outside position is the most convenient and currently preferred position. Alternatively, the heating element could be positioned on the inside wall of each conduit or could be formed within the material forming the conduits 14. Further, the heating element 54 need not be electrical and could comprise tubes for carrying a heated liquid to produce the desired heating at the inner surface of the conduits 14. Also the heater element may be an infrared heater or some other radiant-type heater and thus need not be in contact with the conduits.

In operation, a combination of fat and lean meat is introduced into the grinder 12 and the grinder extrudes the material through the die plate 34 and into the tubes or conduits 14. As the material passes through the conduits, each heater element 54 heats its respective conduit to prevent the material from sticking to the inner wall of the conduit and particularly at the sensor portion 40 of the conduit. As material from each conduit 14 passes across the corresponding portion 40, the photoelectric sensor 18 for each conduit detects the presence of fat or lean meat. Circuit 28 transmits corresponding signal including a suitable delay to the double acting solenoid 26. The solenoid 26 positions the shuttle block 44 in accordance with the time required for the material sensed at sensing portion 40 of the conduit 14 to traverse the tube extension 22 to direct fat to one collection bin 30 or 32 and direct lean meat to the other collection bin.

In the alternate form of the invention shown in FIG. 4, the buildup preventing means includes a non-stick material 60 such as TEFLON plastic or other suitable material positioned on the inner surface of each conduit 14. The non-stick material 60 prevents the material in the conduit 14 from sticking even at normal temperatures at which the meat is handled. Alternatively, the non-stick material 60 on the inner surface of each conduit 14 may be employed with a heater element such as the heater elements 54 described with respect to FIGS. 1 through 3 to ensure that material does not collect on the inner surface of the conduits 14. The non-stick material 60 on the inner surface of each conduit 14 allows the device 10 to be used efficiently without subjecting the meat components to be separated to additional heat which may produce undesired effects in the material.

The above-described preferred embodiments are intended to illustrate the principles of the invention, but not to limit the scope of the invention. Various other embodiments and modifications to these preferred embodiments may be made by those skilled in the art without departing from the scope of the following claims. For example, although the form of the invention illustrated in the Figures show an electrical resistance-type heater, any type of heater may be used to heat the conduit according to the invention. Heated water, gas, or steam could be used to heat the conduit to avoid the material build-up.

I claim:

1. In an apparatus for separating components of meat products comprising means for extruding a combination of the components including fat into one or more generally continuous chains of material, each chain of material passing through an extruding conduit, sensing means for sensing the presence of a meat product component along the length of the chain, and a separation apparatus responsive to the sensing means for diverting the components in each of the chins, the improvement comprising:

(a) a heater for heating an inner wall of each extruding conduit to a fat melting temperature sufficient to liquify fat at said inner wall at least along a sensing portion of each conduit.

2. The apparatus of claim 1 wherein:

(a) the heater extends substantially the entire length of each conduit for heating the conduit walls along substantially the entire length thereof.

3. The apparatus of claim 1 wherein the heater includes an electrical resistance heating element associated with the conduit.

4. The apparatus of claim 1 further comprising a non-stick material forming the inner surface of each extruding conduit.

5. The apparatus of claim 4 wherein the non-stick material comprises TEFLON material.

6. A method for separating components of meat products, the method comprising the steps of:

(a) extruding the meat product into a conduit to form a generally continuous chain of material;

(b) heating an inner wall of the conduit to a fat melting temperature sufficient to liquify fat at said inner wall at least along a sensing portion of the conduit;

(c) sensing the presence of the components along the sensing portion of the conduit; and (d) diverting the respective components from the continuous chain toward separate collection devices, the step of diverting the respective components being dependent upon the step of sensing the presence of those components along the sensing portion of the conduit.

7. The method of claim 6 further comprising the step of:

(a) heating the inner wall of the conduit to the fat melting temperature along substantially the entire length of the conduit.

8. The method of claim 6 wherein the inner wall of the conduit comprises a non-stick material.

* * * * *

UNITED STATES PATENT AND TRADEMARK OFFICE
CERTIFICATE OF CORRECTION

PATENT NO. : 5,520,287

DATED : May 28, 1996

INVENTOR(S) : Eldon Roth

It is certified that error appears in the above-identified patent and that said Letters Patent is hereby corrected as shown below:

In Claim 1, Column 5, Line 34: change "chins" to --chains--.

Signed and Sealed this

Seventeenth Day of September, 1996

*Attest:*

BRUCE LEHMAN

*Attesting Officer*

*Commissioner of Patents and Trademarks*